(12) United States Patent
Kremerman

(10) Patent No.: US 10,987,607 B2
(45) Date of Patent: Apr. 27, 2021

(54) SHORT DISTILLATION HEAD WITH INTEGRATED COOLING SPIRAL

(71) Applicant: Elliot Kremerman, Los Gatos, CA (US)

(72) Inventor: Elliot Kremerman, Los Gatos, CA (US)

( * ) Notice: Subject to any disclaimer, the term of this patent is extended or adjusted under 35 U.S.C. 154(b) by 0 days.

(21) Appl. No.: 17/019,432

(22) Filed: Sep. 14, 2020

(65) Prior Publication Data

US 2020/0406161 A1    Dec. 31, 2020

Related U.S. Application Data

(63) Continuation-in-part of application No. 16/926,859, filed on Jul. 13, 2020, now Pat. No. 10,874,955.

(51) Int. Cl.
*B01D 1/08* (2006.01)
*B01D 5/00* (2006.01)

(52) U.S. Cl.
CPC ............. *B01D 1/08* (2013.01); *B01D 5/0006* (2013.01); *B01D 5/006* (2013.01)

(58) Field of Classification Search
CPC ......... B01D 1/08; B01D 5/0006; B01D 5/006
See application file for complete search history.

(56) References Cited

U.S. PATENT DOCUMENTS

| | | | | |
|---|---|---|---|---|
| 2,293,257 A * | 8/1942 | Gunn | ....................... | B01D 3/42 137/262 |
| 2,427,142 A * | 9/1947 | Hornbacher | ......... | G01N 25/145 165/73 |
| 2,582,969 A * | 1/1952 | Dinsmore | ............... | B01L 3/569 165/177 |
| 3,020,211 A * | 2/1962 | Smith | .................... | B01D 1/225 203/72 |
| 3,334,966 A * | 8/1967 | Shepherd | .............. | C01B 35/068 423/294 |
| 3,340,157 A * | 9/1967 | Weiss | ................... | B01D 1/0017 202/180 |
| 3,416,999 A * | 12/1968 | Shepherd | .................. | C01B 6/10 202/161 |
| 3,607,662 A * | 9/1971 | Glover | ................. | B01D 5/0045 202/160 |
| 4,235,677 A * | 11/1980 | Karamian | ............ | B01D 5/0006 137/251.1 |
| 4,437,937 A * | 3/1984 | McGraw | ................... | B01D 3/28 202/160 |
| 4,471,836 A * | 9/1984 | Hokanson | ................. | F28B 9/10 165/111 |
| 5,076,349 A * | 12/1991 | Kadono | ............... | B01D 5/0042 165/111 |

(Continued)

*Primary Examiner* — Jonathan Miller
(74) *Attorney, Agent, or Firm* — Michael J. Feigin, Esq.; Feigin and Fridman LLC

(57) ABSTRACT

A distillation apparatus has a cooling spiral surrounding at least a part of a vertical extent of a fraction collector in the disclosed technology. Connecting to and/or extending into an interior space of the fraction collector is an end of a vertically-extending passageway. This passageway is functionally connected at an other end to a lower-end entry portal. An outer cover substantially covers the cooling spiral, fraction collector, and a portion of the vertically-extending passageway, excepting for a top portal, a side exit portal, at least one cooling spiral intake, and at least one cooling spiral outtake.

17 Claims, 8 Drawing Sheets

(56) References Cited

U.S. PATENT DOCUMENTS

| | | | | |
|---|---|---|---|---|
| 5,885,313 | A * | 3/1999 | Okamoto | B01D 3/085 |
| | | | | 55/315.2 |
| 5,951,825 | A * | 9/1999 | Land | B01D 5/0006 |
| | | | | 202/185.3 |
| 9,895,626 | B2 * | 2/2018 | Kremerman | B01J 19/30 |
| 10,029,188 | B2 * | 7/2018 | Kremerman | B01D 3/085 |
| 10,279,281 | B2 * | 5/2019 | Kremerman | B01D 3/143 |
| 10,406,451 | B2 * | 9/2019 | Maibach | B01D 3/16 |
| 10,493,374 | B2 * | 12/2019 | Wells | B01D 5/006 |
| 10,751,638 | B2 * | 8/2020 | Maibach, Jr. | B01D 5/0087 |
| 2015/0367250 | A1 * | 12/2015 | Alstin | B01D 5/0063 |
| | | | | 202/170 |
| 2018/0065060 | A1 * | 3/2018 | Wells | B01D 3/12 |
| 2018/0290074 | A1 * | 10/2018 | Kremerman | B01D 3/085 |
| 2019/0076752 | A1 * | 3/2019 | Maibach | B01D 5/006 |

* cited by examiner

SHORT DISTILLATION HEAD WITH INTEGRATED COOLING SPIRAL

FIELD OF THE DISCLOSED TECHNOLOGY

The disclosed technology relates generally to distillation and, more specifically, to a short path distillation head with an integrated cooling spiral.

BACKGROUND

Distillation or fractional distillation is carried out by heating a solid or liquid and removing gaseous vapors that are expelled therefrom. This is typically carried out by raising the temperature and boiling off fractions of the solid or liquid based on their differing boiling points. Separated compounds are removed from a distillation apparatus into an attached condenser in order to be converted from gas into a solid or liquid. Sometimes, however, the condensation process can be slow and/or less than precise when fractions have close boiling points and thus prevent the distillation from functioning at peak efficiency.

Therefore, there is therefore a need for a distillation system which separates fractions more precisely and faster without compromising the efficacy of the distillation.

SUMMARY OF THE DISCLOSED TECHNOLOGY

The disclosed technology is a distillation head and fraction collector with an in-built cooling spiral. This novel combination increases the speed and efficacy of the distillation process by adding a more rigorous step of cooling/condensation before the product exits the fraction collector.

A distillation apparatus of embodiments of the disclosed technology has a cooling spiral surrounded by at least a part of a vertical extent of a fraction collector. Connecting to and/or extending into an interior space of the fraction collector is an end of a vertically-extending passageway. This passageway is functionally connected at an other end to a lower-end entry portal. In this manner, the passageway for vapors can remain hot while a portion of the passageway is cooled. As such, only a portion of the vapors are rejected back down towards a lower entrance to the pathway while the hotter/quicker moving vapors continue onwards through the pathways while a desired fraction condenses and exits the device.

"Functionally connected" is defined as "having a continuous passageway for vapors or liquids to pass through." "Collector" is defined as "a device which is closed except for portals of entry or exit for gases or liquids, each portal being within a single side of a respective collector." "Fraction collector" is defined as "a device used to collect individual portions of mixtures separated through distillation, the separated portions being partially, substantially, or fully condensed therein". "Cooling spiral" is defined as "a spiraled hollow tube through which coolant, such as water or oil, flows such that a temperature of an area which surrounds the tube is lowered".

A "distillation apparatus" is defined as a device in which vapors of a solid, liquid, or combination solid and liquid product to be distilled move upwards therein before exiting therefrom such as into a distribution adapter or condenser. "Distillate" refers to, and is defined as, the vapor, liquid, or combination thereof which exits, by way of the fraction collector, from the distillation head and is ultimately fractionally distilled into component parts, each component part having different physical properties such as a different boiling point.

In some embodiments, an outer cover surrounds the fraction collector, the cooling spiral, and at least a majority of the vertically extending passageway. An intake and an outtake of the cooling spiral, in embodiments, can pass through the outer cover.

"Intake" is defined as "an area through which a substance or object, e.g. coolant, is brought into an area or part of a device". "Outtake" is defined as "an area through which a substance or object, e.g. coolant, is expelled from an area or part of a device".

The fraction collector, in various embodiments of the disclosed technology, has an outer wall with a curvilinear upper portion, a curvilinear lower portion, and a vertical middle portion. The vertical middle wall can form a unitary wall with the curvilinear upper portion and the curvilinear lower portion of the wall. In embodiments, the vertical middle portion may surround the cooling spiral. The intake and outtake of the cooling spiral, in some embodiments, pass through the outer wall of the fraction collector.

"Interior" is defined as "a mostly enclosed space and passageway designed for passage of gas, liquid and/or solid there-through". "Exterior" is defined as "outside of and relative to a mostly enclosed space.".

In some embodiments, the cooling spiral further comprises an interior space. This interior space is separate from a continuous passageway formed within the vertically extending passageway, the fraction collector, a side exit portal of the fraction collector, and a top portal of the fraction collector. The cooling spiral passageway is, in embodiments of the disclosed technology, separate from a passageway for gas (vapors) and liquid being distilled from a solid beneath the distillation apparatus.

The cooling spiral has, in some embodiments, an upper end, a spiral, and a lower end. The upper end terminates at a horizontal plane which is inline with the curvilinear upper portion, and the lower end terminates at a horizontal plane which is inline with curvilinear lower portion. The spiral is surrounded by, in embodiments, a majority of the vertical middle portion.

In embodiments, a hollow space exists between the vertical middle portion of the out wall of the fraction collector and between the cooling spiral. A first end of the cooling spiral, in some embodiments, terminates at the intake, while a second end terminates at the outtake.

The outer cover can directly surround an entirety of the vertical middle portion of the wall as well as the upper and the lower portions of the wall of the fraction collector. The vertical middle wall of the fraction collector surrounds the cooling spiral.

At least a majority of the cooling spiral is, in embodiments, above the side exit portal of the fraction collector.

The vertically extending passageway, in some embodiments, further has a top edge which extends into a part of the fraction collector which is surrounded by the lower portions and a portion of the middle portions of the wall of the fraction collector. This top edge may terminate inline with a part of the side exit portal which is below a top part of the side exit portal, and may be situated below a horizontal plane of a lowest edge of the cooling spiral.

"Inline" is defined as "sharing a horizontal or vertical plane therewith".

In various embodiments, the vertically extending passageway further has a lower collection region and a tube. A largest circumference of the lower collection region can be wider than a largest circumference of the tube, and the largest circumference of the lower collection region can be substantially smaller than a largest horizontally-oriented circumference of the cooling spiral.

"Circumference" is defined as "measure of a length of a circular or ovoid enclosing boundary of a named part of the device described herein".

The cooling spiral intake is, in some embodiments of the disclosed technology, situated horizontally inline with the cooling spiral outtake. In other embodiments, all horizontal planes passing through the cooling spiral intake are above all horizontal planes passing through the cooling spiral outtake, and the cooling spiral outtake is horizontally inline with the side exit portal.

Described differently, a distillation apparatus of embodiments of the disclosed technology has a first continuous internal region extending from a bottom end of the apparatus to a side exit portal. A cooling spiral with a second continuous internal region, forming a separate interior space than the first continuous internal region, surrounds a portion of a vertical extent of the continuous internal region. In some embodiments, the first internal region may extend below the cooling spiral. The second continuous region lacks portals to the first continuous region, in various embodiments.

"Vertical extent" is defined as "a portion which has a vertical length throughout which its cross-sections are substantially identical".

The distillation apparatus further has, in various embodiments, an outer cover surrounding each of substantially an entirety of the first continuous internal region and the cooling spiral. The outer cover can have therein a top portal of the first continuous internal region. It can have therein an intake of the cooling spiral and/or an outtake of the cooling spiral. It can also have therein a side exit portal of the first continuous internal region. In some embodiments, a majority of horizontal planes passing through the side exit portal are below all horizontal planes passing through each of the intake and the outtake.

"Surrounding" is defined as "forming a unitary structure and covering and/or being contiguous with at least one point on every vertical or on every horizontal line on a thing being surrounded".

In various embodiments, the bottom section of the distillation tube has a narrower portion and a wider portion, with the narrower portion extending above a highest horizontal plane of the wider portion. The cooling spiral, in embodiments, has a lowest horizontal plane which is above the wider portion and which is above a majority of the narrower portion.

Put otherwise, a distillation has an internal glass section with a lower intake and a side outtake. A vertically-extending portion of the internal glass section is surrounded by a hollow glass spiral. A majority of the vertically-extending portion which is surrounded by the spiral is vertically above the side outtake, in embodiments.

A hollow distillation key is attached to the structure at a side and extends through a fraction collector and a bottom region of the internal glass section, and is spaced apart therefrom.

The distillation key, in embodiments, has two portals. A first portal extends into a substantially vertical hollow tube disposed within and extending through a majority of a vertical rise of the distillation key. A second portal opens into the hollow internal region of the distillation key.

The substantially vertical hollow tube, in embodiments, has a lowest extent which shares a horizontal plant with a region of the distillation apparatus adapted for placement within a boiling flask while a rest of the distillation apparatus exterior of the boiling flask.

The directional descriptors used in this disclosure, such as "top", "bottom", "vertical", "horizontal", "upper", "lower", "above", and "below" are relative to a typical direction of use with a heat source below the portion of the vertically-extending passageway substantially farthest from a top portal of the apparatus.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

A distillation apparatus has a cooling spiral surrounding at least a part of a vertical extent of a fraction collector in the disclosed technology. Connecting to and/or extending into an interior space of the fraction collector is an end of a vertically-extending passageway. This passageway is functionally connected at an other end to a lower-end entry portal. An outer cover substantially covers the cooling spiral, fraction collector, and a portion of the vertically-extending passageway, excepting for a top portal, a side exit portal, at least one cooling spiral intake, and at least one cooling spiral outtake.

Embodiments of the disclosed technology will become more clear in view of the following discussion of the figures.

Figure 1:
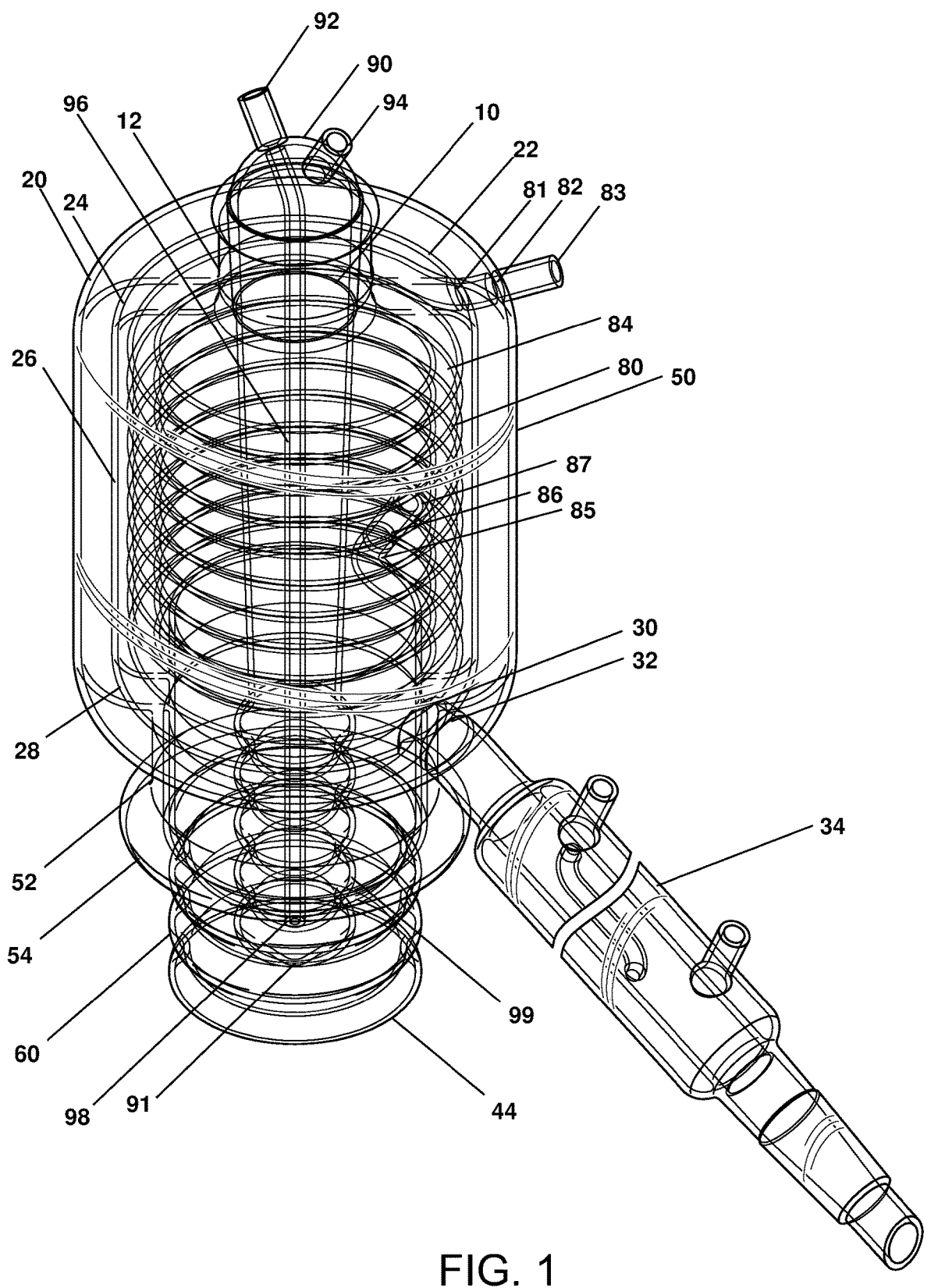
FIG. 1 shows a top and right side perspective view of a distillation apparatus of embodiments of the disclosed technology.
Figure 2:
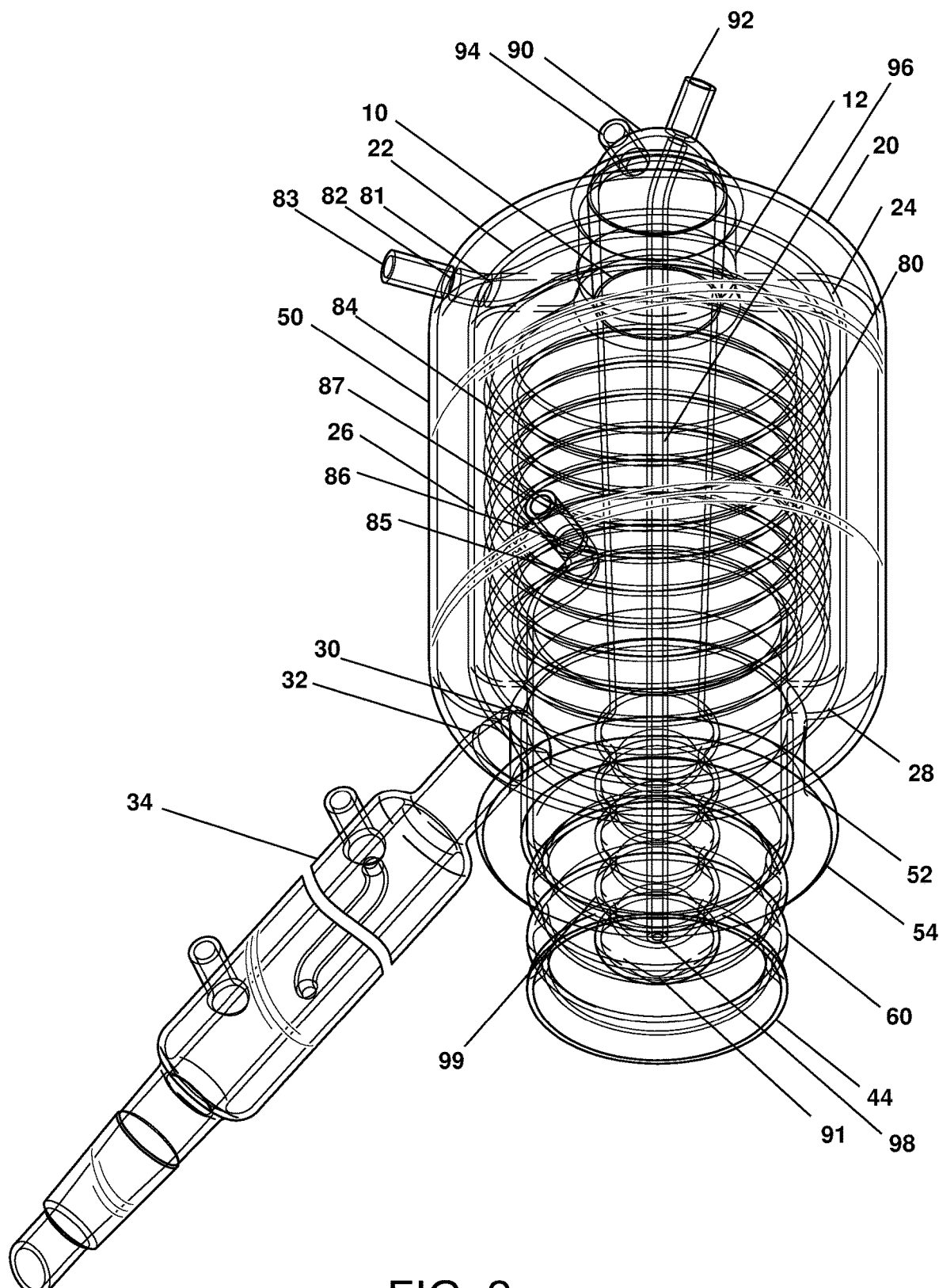
FIG. 2 shows a bottom and left side perspective view of the distillation apparatus of FIG. 1.

FIG. 1 shows a top and right side perspective view of a distillation apparatus of embodiments of the disclosed technology. FIG. 2 shows a bottom and left side perspective view of the distillation apparatus of FIG. 1. Describing from roughly top to bottom for ease of reading, at the top, in some embodiments, a top portal 10 of the fraction collector 22 functionally connects/opens into a neck 12 in which is inserted a distillation key 90. In other embodiments, the fraction collector 22 can be closed at a top side, neck 12 can be closed, or neck 12 can be open such that a stopper, thermometer, or other instrument may be inserted therein.

A cooling spiral 80 is partially or wholly surrounded by the fraction collector 22. In other embodiments, the cooling spiral 80 is surrounded by different or additional segments of fraction collector 22 such as one or more of the upper curvilinear section 24 and lower curvilinear section 28. In further embodiments, the cooling spiral 80 surrounds at least a portion of vertical tube 42. In further embodiments, the cooling spiral 80 surrounded a part or substantially all of the fraction collector 22. In some embodiments, at least a part of middle vertical extent 26 or any other part of the fraction collector or vertically extending tubes described herein, is, in embodiments of the disclosed technology, simultaneously a part of the cooling spiral 80. In other embodiments, there exists a gap between the walls 24, 26, 28 of the fraction collector and between the cooling spiral 80. In various embodiments, the interior space of the cooling spiral 80 is separate from an interior space 21 of the fraction collector 22 and the tube 42.

In the embodiment shown, an intake tube 83 of the cooling spiral 80 connects to a portal 82 in an outer cover 20 and to a portal 81 in the wall of the fraction collector 22. An outtake tube 87 of the cooling spiral 80 connects to a portal 86 in the outer cover 20 and to a portal 85 in the fraction collector 22. In other embodiments, the cooling spiral 80 may be wholly exterior to the fraction collector 22, and the intake tube 83 and the outtake tube 87 may connect only to, respectively, portals 82 and 86 in the outer cover 20.

Figure 3:
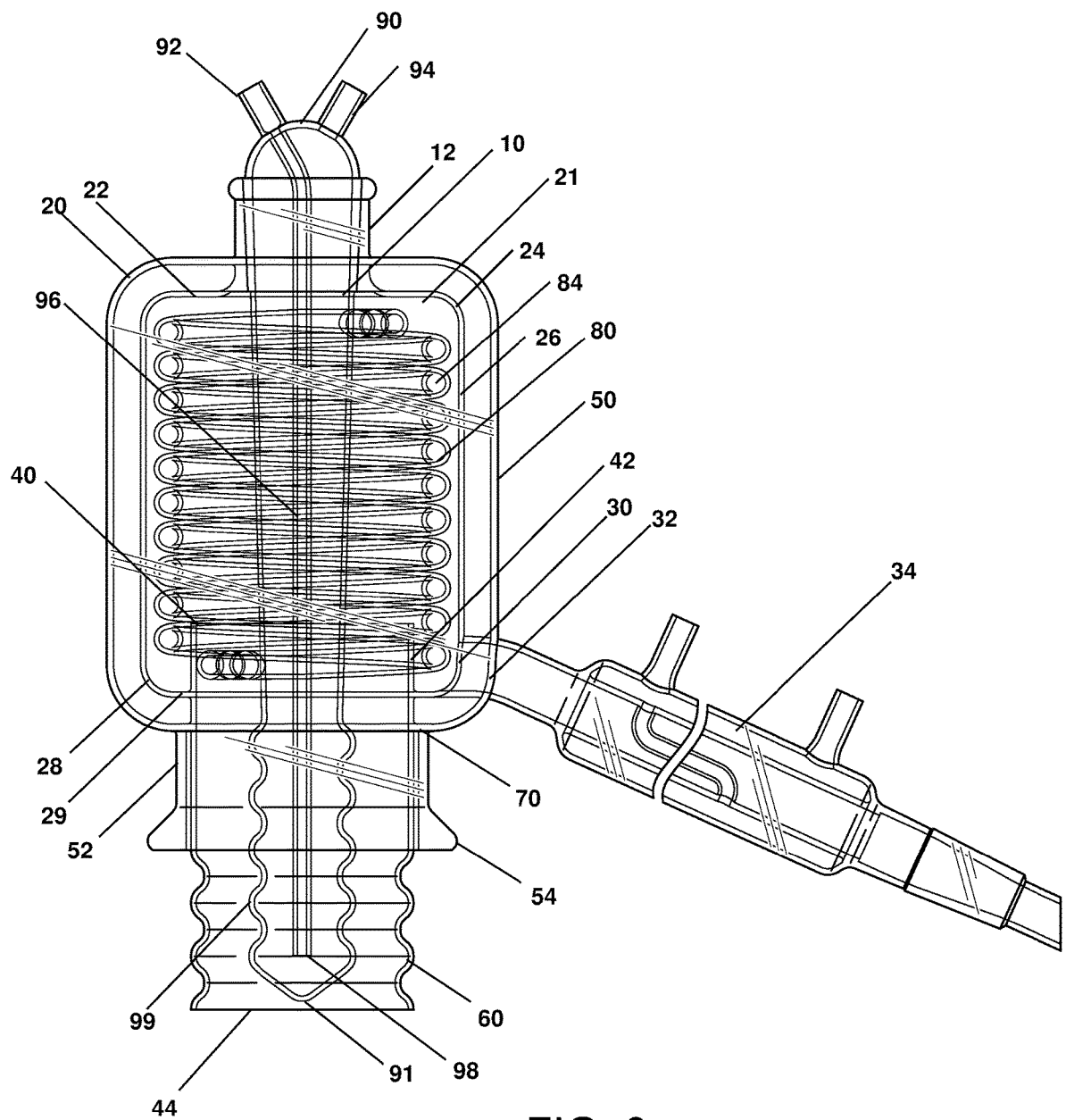
FIG. 3 shows a right side elevation view of the distillation apparatus of FIG. 1.
Figure 4:
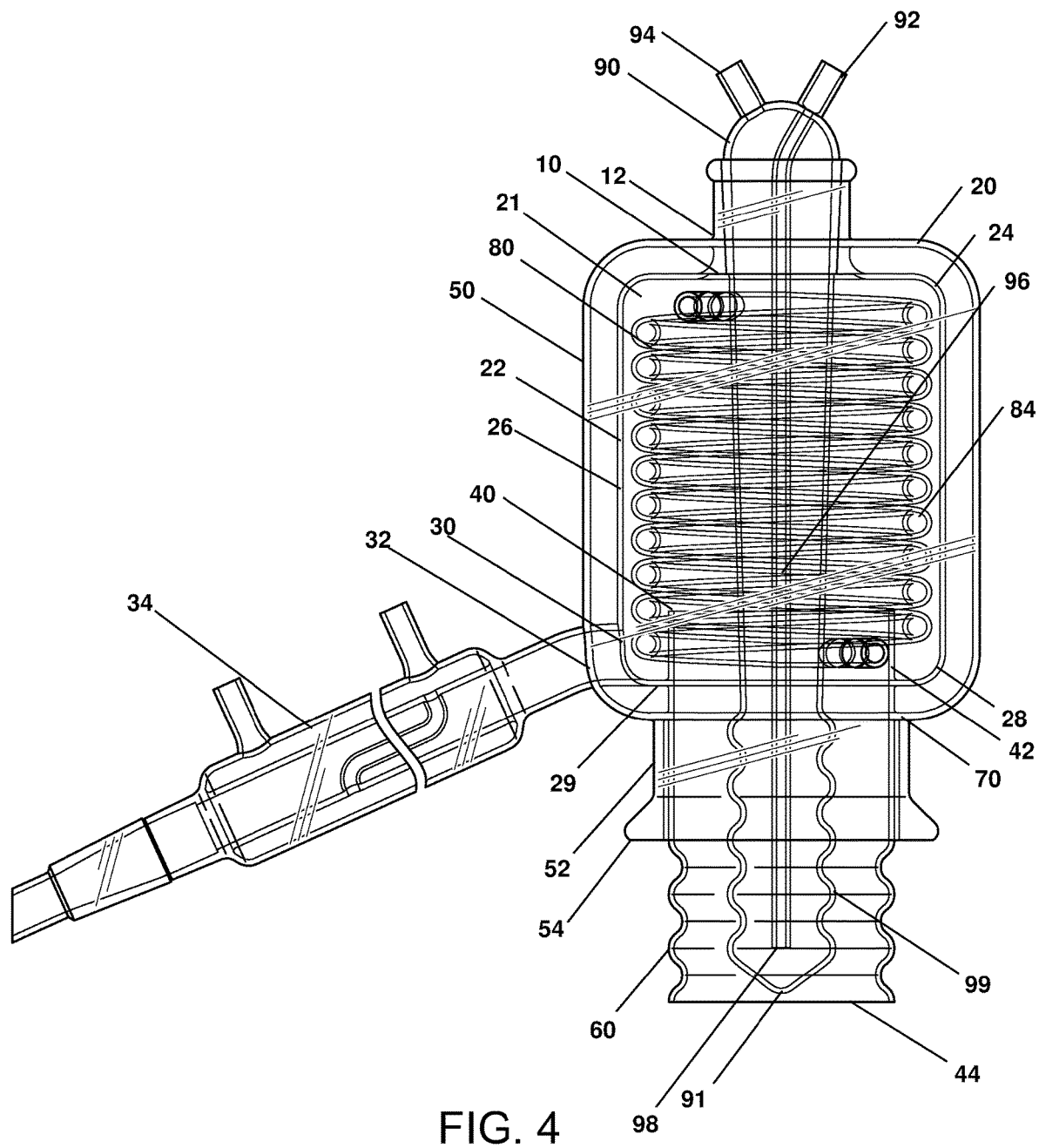
FIG. 4 shows a left side elevation view of the distillation apparatus of FIG. 1.

FIG. 3 shows a right side elevation view of the distillation apparatus of FIG. 1. FIG. 4 shows a left side elevation view of the distillation apparatus of FIG. 1. As shown in these figures, the fraction collector 22 has a bottom side 29 which can be a) angled, relative to the bottom of the device, and/or b) flat/horizontal relative to the bottom of the device. The bottom side 29 of the fraction collector 22 can have an opening there-in through which a tube 42 passes therein. The tube 42 extends vertically in some embodiments of the disclosed technology and has an opening at each of a top edge 40 and bottom edge 60. The top edge 40 and opening into the fraction collector 22 is within a space circumscribed by (surrounded by or substantially surrounded by) the fraction collector. In this manner, vapors which extend above the vertical tube must condense before dropping to the bottom side 29 of the fraction collector which is in line with a side exit portal 30 which passes between the fraction collector 22 and condenser entry area 32 before entering a main body of the condenser 34 where the liquids are further cooled, such as by way of a cold water flow, or other coolant, around the path of the liquid passing through the condenser. Cold water is defined as water which has a temperature substantially equal to or below ambient room temperature. In other embodiments, the top edge 40 of vertical tube 42 terminates at a bottommost part of the lower curvilinear wall 28 and/or of a wall of fraction collector 22 rather than extending into fraction collector 22.

In the embodiment shown, the fraction collector 22 has walls comprising an upper curvilinear section 24, a middle vertical extent 26, and a lower curvilinear section 28. In other embodiments, there exist one or more additional wall segments with same or different shapes.

As shown in this embodiment, the condenser entry area 32 extends outward from the side exit portal 30 and at a downward angle relative to a horizontal plane. Condenser 34 is situated at a substantially identical downward angle as that of the condenser entry area 32.

Also shown in this embodiment is that the intake tube and portals 83, 82, 81 are partially or completely horizontally inline with the upper curvilinear portion 24 of the walls of the fraction collector 22. Further shown, the outtake tube and portals 87, 86, 85 are partially or completely horizontally inline with the lower curvilinear portion 28 of the walls of the fraction collector 22.

Figure 5:
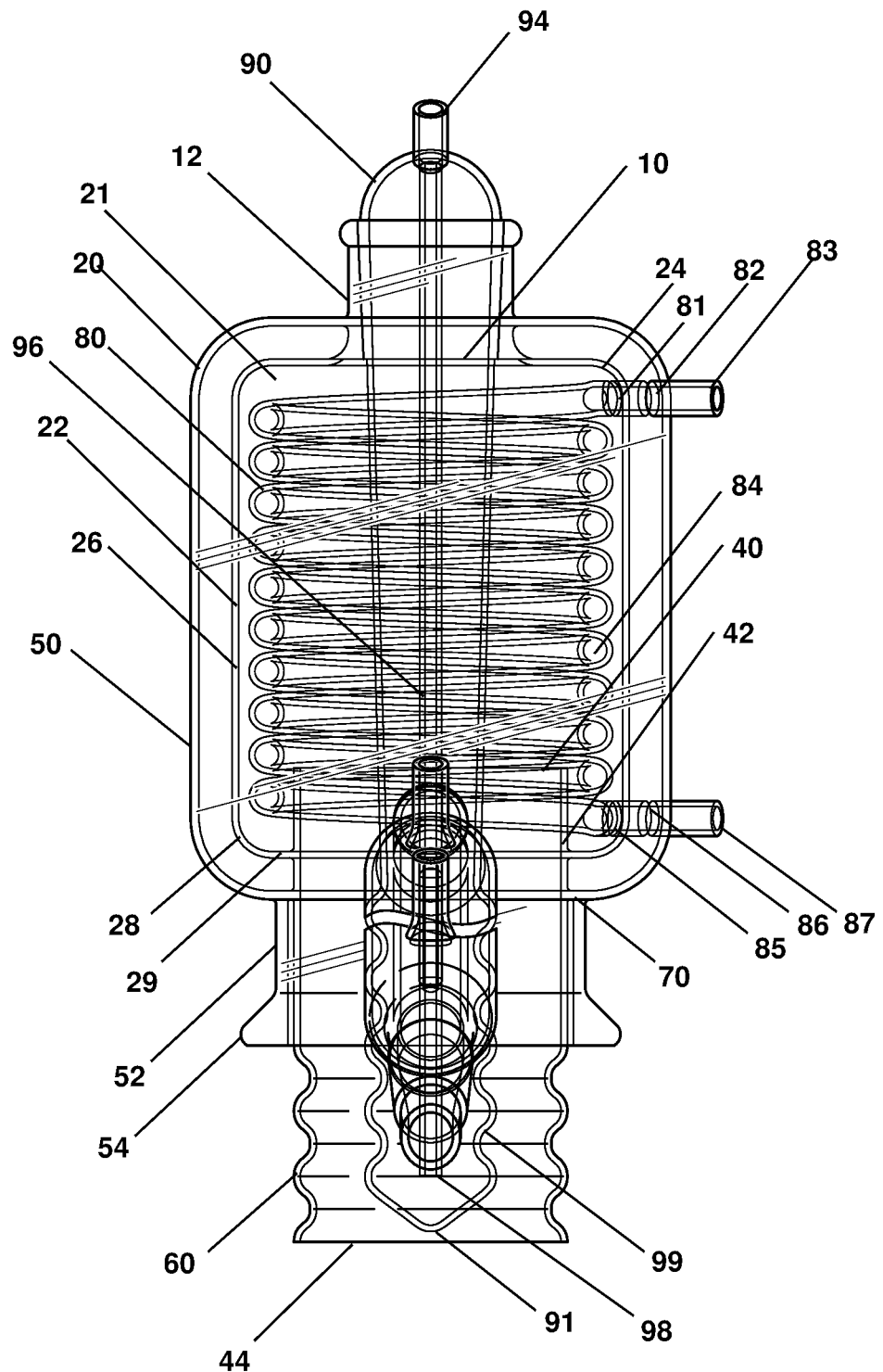
FIG. 5 shows a front elevation view of the distillation apparatus of FIG. 1.
Figure 6:
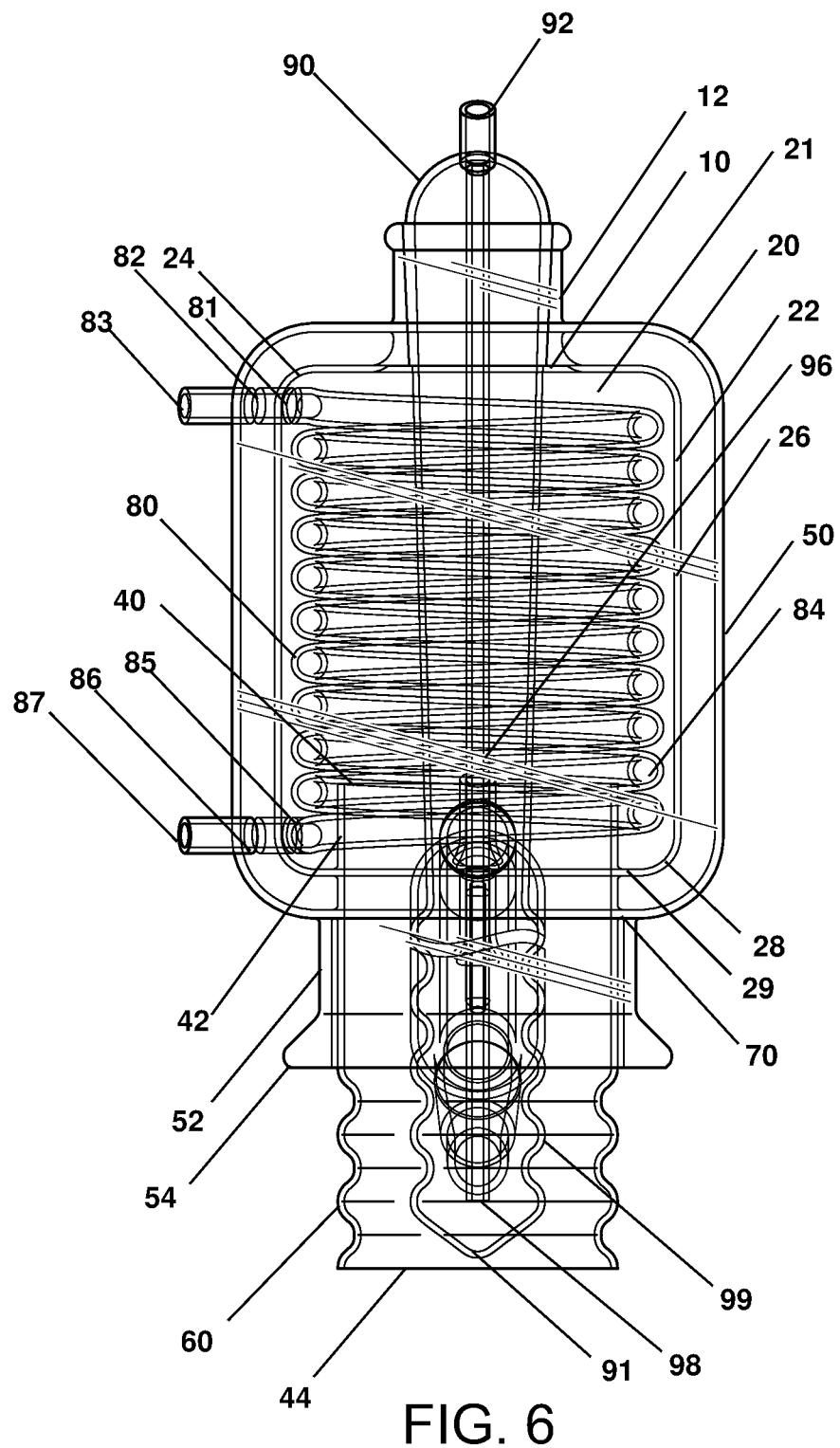
FIG. 6 shows a back elevation view of the distillation apparatus of FIG. 1.

FIG. 5 shows a front elevation view of the distillation apparatus of FIG. 1. FIG. 6 shows a back elevation view of the distillation apparatus of FIG. 1. As shown in these figures, the outer cover 20 has a wider region 50 which extends above and around the fraction collector 22, a thinner region 52 which circumscribes a portion of the undulating region 60 of the tube 42, and a flared region 54 which circumscribes a portion of the undulating region 60 of the tube 42 which, when the distillation apparatus is held in an upright position, is below the portion of the undulating region 60 of the tube 42 circumscribed by the thinner region 52. The flared edge 54 can be adapted to cover and substantially or fully create a seal or airtight seal or connection with an upper end of a flask or boiling flask. As such, vapors extending out of a flask situated below the distillation device shown (e.g. in FIG. 5) move substantially or fully upwards into the distillation apparatus by way of passage into the outer cover (between walls 52) and/or into the lower portal 44 of the tube 42.

The cover 20, as a whole, surrounds the fraction collector 22 and cooling spiral 80 such as in an unencumbered manner, at every horizontal cross section in embodiments of the disclosed technology but for where the side portal 30, intake tube 86, and outtake tube 88 extend there-through. "Unencumbered" is defined as "at a horizontal cross section, having no other portion of the distillation apparatus surrounding or to the outside of." An interior space of the cooling spiral 80 is also unencumbered, in embodiments of the disclosed technology.

In some embodiments of the disclosed technology, a tube 42 extends into the fraction collector 22 by way of an upper portal 40. The tube 42 has a lower undulating portion 60 connecting to a lower portal 44. The tube 42 extends through and below and interior circumscribed (substantially surrounded by) the outer cover 20. By way of this passage of the tube 42 into the fraction collector 22, a rejection area 70 is created between the tube 42 the outer wall 20. Vapors then experience turbulent flow or condensation causing movement downwards until passing upwards through the lower portal 44 of the tube 42.

A distillation key 90 is connected to and/or disposed within the neck 12 and extends downward through fraction collector 22, cooling spiral 80, and tube 42 in an unencumbered manner. A lowest point 91 of the key 90 extends to a point within and slightly above the lower portal 44 of the tube 42. In other embodiments, the lowest point 91 of the key 90 may extend into a point which is substantially inline with or below the lower portal 44 of the tube 42. A lower portion 99 of the key 90 has undulating sidewalls.

The distillation key 90 has a bulbous upper head on which are disposed two portals 92, 94. A first portal 92 is connected to an internal hollow section 96 of the key 90. A second portal 94 is connected to an internal space of the key 90. The internal hollow section 96 extends through a majority of the internal space of the key 90 in an unencumbered manner. A majority of the internal hollow section 96 is substantially straight. The internal hollow section 96 terminates at a lower portal 98.

The undulating side walls of both the undulating region 60 of the tube 42 and of the lower region 99 of the distillation key 90 move inwards and outwards in a repeating pattern. In the embodiment shown, a portion of the lower region 99 is above the undulating region 60. In other embodiments, the lower region 99 is entirely surrounded by and/or below the undulating region 60. At every point where the lower region 99 is surrounded by the undulating region 60, the undulations of each relative side wall correspond (i.e. the undulations of one move inward and outward at a same respective cross section at the other).

In another embodiment, vapors rise directly into the bottom portal 44 of vertical tube 42. Vertical tube 42 may have, in various embodiments, a more and/or a less bulbous portion thereof.

In some embodiments, a bottom end of a vertically-extending distillation tube 42 has a portal open to a bottom side of the device, such as a portal 44 and bottom end 60 thereof which are, or can be, inserted into a boiling flask. In such an instance, vapors extending upwards from the boiling flask further continue to extend upwards into the distillation tube, such as in a manner lacking obstruction between a top end of the boiling flask and the bottom portal into the distillation tube.

Vapors which do enter the tube 42 continue upwards into the fraction collector 22 before condensing and falling to the bottom 29 of the fraction collector 22. Continued upward moving vapors from the vertical tube, which are often warmer than the condensing vapors, prevent a majority or substantially all of condensed liquid, in embodiments of the disclosed technology, from falling down through the vertical tube 42. Rather, the vapors condense into liquid at the bottom 29 of the fraction collector 22, outside of the tube 42 and then flow out the side portal 30 which shares a lowest side or floor with the fraction collector, passing then into the condenser 34.

While the vapors move upward through the tube 42, the undulating sides of the lower region 99 of the distillation key 90 as well as the undulation sides of the undulating region 60 cause the vapors to experience a turbulent flow. This causes heavier particles to fall downwards while the lighter parties rise further upwards.

The distillation key 90 can further be filled with water as a method of cooling and/or heating the area surrounding the distillation key 90. The water may be added through either the first portal 92 or through the second portal 94. In this way, the distillation key may assist in heating a product (through the addition of hot water, defined as water which has a temperature substantially equal to or below ambient room temperature) or in cooling a product (through the addition of cold water).

The outer cover further surrounds the tube 40, a part of the tube 40 being unencumbered by other elements (e.g. fraction collector or lower collection region) in some embodiments of the disclosed technology. The outer cover further surrounds part or a majority of (more than 50%) the lower collector region 60 and the cooling jacket 80 covers a majority of the fraction collector 22 and/or minority of a vertical tube 40. Side walls 50 form a right angle or substantially a right angle or rounded corner with a horizontal seal 70 in a unitary connection in embodiments of the disclosed technology.

As shown by FIGS. 5-6, the bottom side 29 of fraction collector 22, which is partially formed by the lower curvilinear section 28 of the walls of fraction collector 22, can be flat/horizontal around an opening which a top edge 40 of tube 44 extends there-through.

As shown in this embodiment, particularly that of FIG. 3, the intake tube 83 and outtake tube 87 connect to portals 82, 81 and 86, 85, respectively, and terminate in an area exterior to the outer cover 20. In some embodiments, these tubes connect only to portals 81 and 85 (respectively) and instead terminate in an area interior to the outer cover 20 and exterior to the fraction collector 22. Furthermore, in this embodiment, an interior space 84 of the cooling spiral 80 has a substantially identical height, width, and depth at every parallel horizontal or vertical cross section excepting those of spirals closest to the intake tube 83 and the outtake tube 87. In various other embodiments, some horizontal or vertical cross sections differ from other horizontal or vertical cross sections in at least one dimension.

Figure 7:
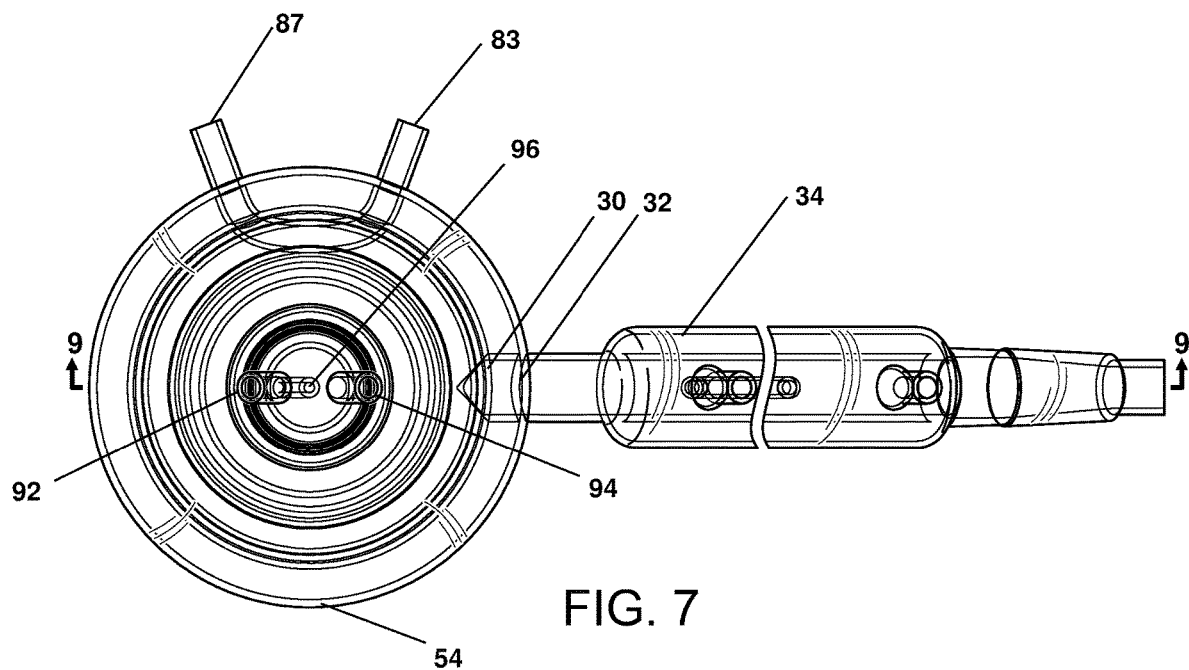
FIG. 7 shows a top plan view of the distillation apparatus of FIG. 1.
Figure 8:
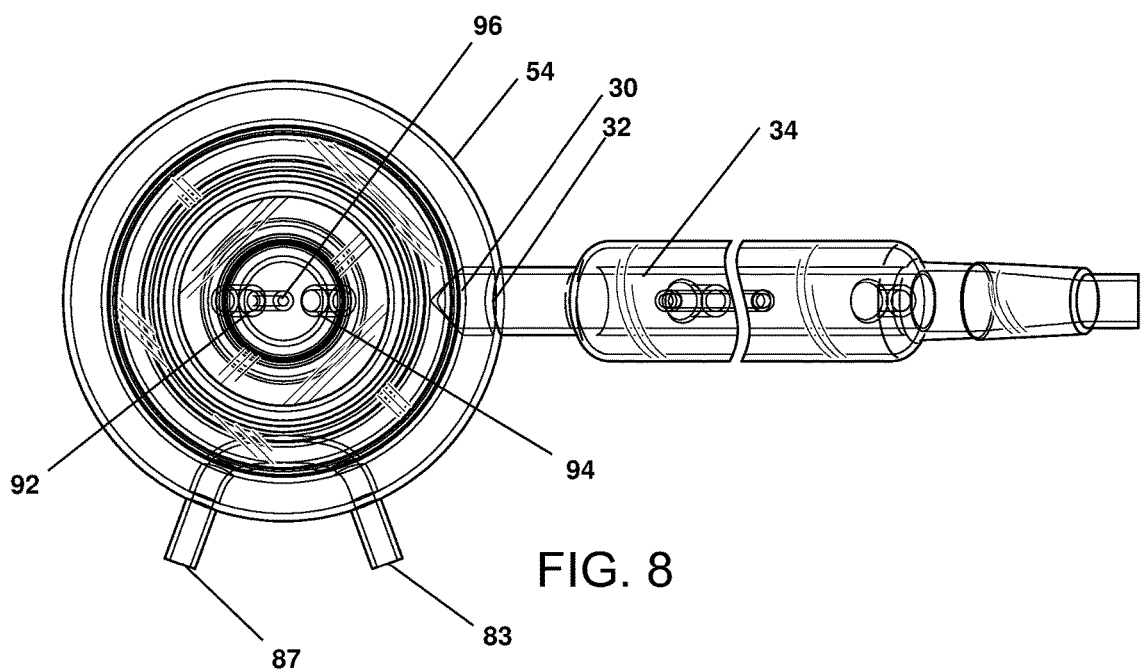
FIG. 8 shows a bottom plan view of the distillation apparatus of FIG. 1.

FIG. 7 shows a top plan view of the distillation apparatus of FIG. 1. FIG. 8 shows a bottom plan view of the distillation apparatus of FIG. 1. In various embodiments, the intake tube 83 and portals 82, 81, and the outtake tube 87 and portals 86, 85, are located inline (in a same horizontally or vertically-oriented plane) with each other, or are disposed such that intake tube and portals 83, 82, 81 are vertically above or below (in a same vertically-oriented plane) outtake tube and portals 87, 86, 85. Intake tube and portals 83, 82, 81 may be offset from outtake tube and portals 87, 86, 85 by any number of degrees, such as 180 or 90. Intake tube 83 and outtake tube 87 may be substantially identical. Intake portals 82, 81 and outtake portals 86, 85 may be substantially identical. Alternatively, intake and outtake portals 82 and 86 in the outer cover 20 may be substantially, while intake and outtake portals 81 and 85 in the fraction collector 22 may be substantially identical. Intake tube and portals 83, 82, 81 and/or outtake tube and portals 87, 86, 85 may be horizontally inline with and/or vertically inline with side exit portal 30 and/or condenser entry area 32.

In this embodiment, the intake tube 83 and the outtake tube 87 are substantially parallel and horizontal. In various embodiments of the disclosed technology, one or both of the intake tube 83 and the outtake tube 87 are angled above and/or below a horizontal plane which passes through portals 8, 81 and/or 86, 85 and are angled to a right side and/or a left side of a vertical plane which passes through portals 82, 81 and/or 86, 85. Furthermore, in other embodiments, each of intake tube 83, outtake tube 87, intake portals 82, 81, and/or outtake portals 86, 85 may be a plurality of, respectively, intake tubes, outtake tubes, intake portals, and/or outtake portals. Each individual component of the plurality of intake tubes, outtake tubes, intake portals, and/or outtake portals may be substantially identical or non-identical in size and/or shape.

As shown by FIGS. 7-8, in an embodiment, the flared edge 54 of the side walls 50 of the outer cover 20 have a horizontal circumference which is substantially the largest horizontal circumference of any component of the device shown.

Figure 9:
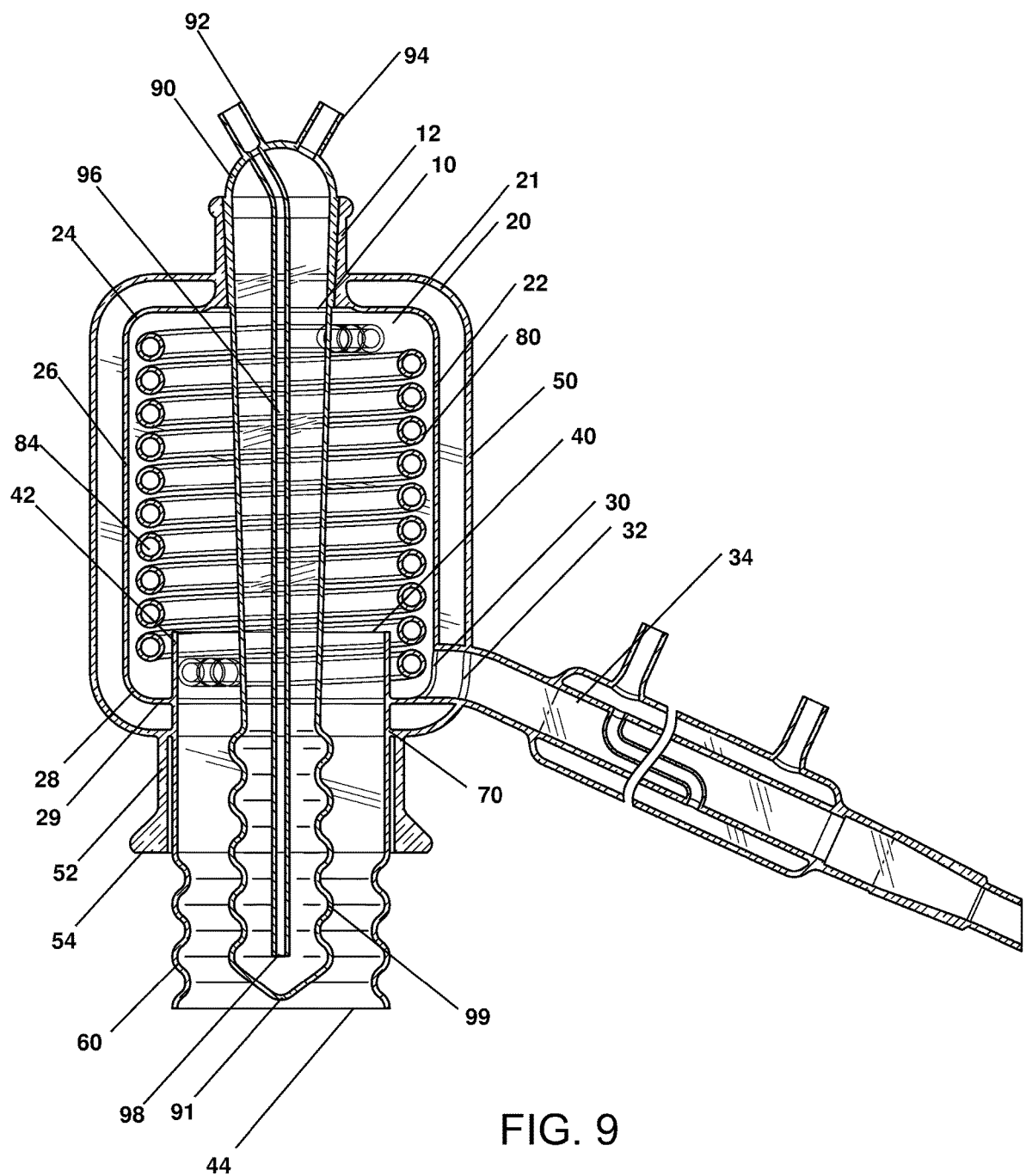
FIG. 9 shows a vertical cross section of the distillation apparatus of FIG. 1.

FIG. 9 shows a vertical cross section of the distillation apparatus of FIG. 1. As shown clearly in this figure, the horizontal seal 70 of the outer cover 20 is connected to the thinner region 52 at the bottom of side walls 50 of the outer cover 20. In various embodiments, at least a part of the horizontal seal 70 may be situated at an angle. The thinner region 52 may be of any width which is smaller than a greatest width of the flared region 54. The horizontal seal 70 may be connected to a different part of the side walls 50 of the outer cover 20.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

The invention claimed is:

1. A distillation apparatus comprising:
a lower end entry portal;
a vertically extending passageway from said lower end entry portal to, or into, a portion of an interior space of a fraction collector which is vertically above a side exit portal of said fraction collector; and
a cooling spiral surrounded by at least a part of a vertical extent of said fraction collector.

2. The distillation apparatus of claim 1, wherein an outer cover surrounds said fraction collector, said cooling spiral, and at least a majority of said vertically extending passageway; and
wherein an intake and an outtake of said cooling spiral pass through said outer cover.

3. The distillation apparatus of claim 2, wherein said fraction collector comprises an outer wall with:
a curvilinear upper portion;
a curvilinear lower portion;
a vertical middle portion forming a unitary structure between said curvilinear upper portion and said curvilinear lower portion; wherein said vertical middle portion surrounds said cooling spiral; and
wherein said intake and said outtake of said cooling spiral pass through said outer wall of said fraction collector.

4. The distillation apparatus of claim 3, wherein said cooling spiral further comprises an interior space which is separate from a continuous passageway formed, said continuous passageway comprising:
said vertically extending passageway, said fraction collector, said side exit portal of said fraction collector, and a top portal of said fraction collector.

5. The distillation apparatus of claim 4, wherein said cooling spiral further comprises:
an upper end which terminates at a horizontal plane of said fraction collector which is inline with said curvilinear upper portion; a spiral which is surrounded by a majority of said vertical middle portion; and
a lower end which terminates at a horizontal plane of said fraction collector which is inline with said curvilinear lower portion.

6. The distillation apparatus of claim 4, wherein a hollow space exists between said vertical middle portion of said outer wall of said fraction collector and between said cooling spiral.

7. The distillation apparatus of claim 6, wherein a first end of said cooling spiral terminates at said intake passing through said outer wall and a second end of said cooling spiral terminates at said outtake passing through said outer wall.

8. The distillation apparatus of claim 7, wherein said outer cover directly surrounds an entirety of said vertical middle portion as well as said upper and said lower portions of said outer wall of said fraction collector; and
said vertical middle portion of said fraction collector surrounds said cooling spiral.

9. The distillation apparatus of claim 8, wherein at least a majority of said cooling spiral is above said side exit portal of said fraction collector.

10. The distillation apparatus of claim 9, wherein said vertically extending passageway further comprises a top edge which extends into a part of said fraction collector surrounded by said curvilinear lower portion of said wall of said fraction collector and by a portion of said vertical middle portion of said wall of said fraction collector and which terminates inline with a part of said side exit portal which is below a top part of said side exit portal, said top edge situated above at least a horizontal plane of a lowest edge of said cooling spiral.

11. The distillation apparatus of claim 10, wherein said vertically extending passageway further comprises a lower collection region and a tube:
wherein a largest horizontally-oriented circumference of said lower collection region is wider than a largest horizontally-oriented circumference of said tube; and
wherein a widest horizontally-oriented circumference of said cooling spiral is wider than said largest horizontally-oriented circumference of said lower collection region.

12. The distillation apparatus of claim 11, wherein said cooling spiral intake is situated horizontally inline with said cooling spiral outtake.

13. The distillation apparatus of claim 11, wherein all horizontal planes passing through said cooling spiral intake are above all horizontal planes passing through said cooling spiral outtake and said cooling spiral outtake is horizontally inline with said side exit portal.

14. A distillation apparatus comprising:
a first continuous internal region with a vertical extent from a bottom section of said apparatus to a side exit portal;
a cooling spiral with a second continuous internal region surrounding a portion of said vertical extent of said first continuous internal region, wherein said second continuous internal region is separate from, and lacking portals to, said first continuous internal region; and
an outer cover surrounding each of substantially an entirety of said first continuous internal region and said cooling spiral;
wherein said outer cover comprises the following portals;
an intake of said cooling spiral;
an outtake of said cooling spiral; and
a side exit portal of said first continuous internal region passing through an exterior wall of said vertical extent as well as said outer cover;
wherein a majority of horizontal planes passing through said side exit portal are below all horizontal planes passing through each of said intake and said outtake.

15. The distillation apparatus of claim 14, wherein said first continuous internal region extends below said cooling spiral.

16. A distillation apparatus comprising:
an internal glass section with a lower intake and a side outtake; and a hollow glass spiral substantially surrounding a vertically-extending portion of said internal glass section;
further comprising a hollow distillation key attached to said distillation apparatus at a top side which extends through a fraction collector and a bottom region of said internal glass section and spaced apart therefrom;
said distillation key passing through substantially a majority of said internal glass section;
wherein a largest horizontal circumference of said distillation key is smaller than a smallest horizontal circumference of said internal glass section;
wherein said distillation key further comprises two portals:
a first portal extending into a substantially vertical hollow tube disposed within and extending through a majority of a vertical rise of said distillation key; and a second portal opening into said vertical hollow tube region of said distillation key;

wherein said substantially vertical hollow tube has a lowest extent which shares a horizontal plane with a region of said distillation apparatus adapted for placement within a boiling flask while a rest of said distillation apparatus is exterior to said boiling flask.

17. The distillation apparatus of claim 16, wherein a majority of said vertically-extending portion surrounded by said spiral is vertically above said side outtake.

* * * * *